United States Patent [19]

Watkins

[11] Patent Number: 4,779,093

[45] Date of Patent: Oct. 18, 1988

[54] BUS INTERFACE WITH PROGRAMMABLE WINDOW FOR DATA TRANSFER

[75] Inventor: Daniel R. Watkins, Cupertino, Calif.

[73] Assignee: LSI Logic Corporation, Milpitas, Calif.

[21] Appl. No.: 836,022

[22] Filed: Mar. 4, 1986

[51] Int. Cl.⁴ .......................... H04J 3/02; H04L 7/00; G08C 15/00

[52] U.S. Cl. .......................... 340/825.57; 340/825.5; 340/825.2; 370/100; 370/85; 364/132

[58] Field of Search ........... 340/825.7, 825.05, 825.62, 340/825.2, 825.5, 825.54; 370/85, 86, 100, 83; 364/132

[56] References Cited

U.S. PATENT DOCUMENTS

| | | | |
|---|---|---|---|
| 3,715,725 | 2/1973 | Kievit et al. | 340/825.54 |
| 3,978,451 | 8/1976 | Ito et al. | 340/825.05 |
| 4,470,140 | 9/1984 | Coffey | 340/825.05 |
| 4,639,912 | 1/1987 | Tanino | 340/825.05 |
| 4,656,627 | 4/1987 | Hasley et al. | 370/85 |

Primary Examiner—Benedict V. Safourek
Assistant Examiner—Ralph E. Smith
Attorney, Agent, or Firm—Walter J. Madden, Jr.; Alan H. MacPherson; Paul J. Winters

[57] ABSTRACT

A bus interface system for communicating between a master bus interface and a plurality of slave bus interfaces includes a plurality of lines extending between the master unit and each of the slave units, the lines including a clock line containing clock signals, a gated clock line containing gated clock signals having a frequency which is a submultiple of the frequency of the clock signals, a data line, a command register line, an active line, and circuitry for exchanging data between the master unit and one of the slave units on the data line under the control of the other lines.

7 Claims, 3 Drawing Sheets

BUS INTERFACE WITH PROGRAMMABLE WINDOW FOR DATA TRANSFER

BACKGROUND OF THE INVENTION

Field of the Invention

This invention relates to interfaces between components, and relates more particularly to interfaces especially adapted for use between digital and analog components.

Prior Art

In prior art interfaces, there has been two general approaches employed. In one, some type of industry standard interface was used. This has the advantage of utilizing a known interface, but many of these standard interfaces are asynchronous and require a great deal of additional logic to provide synchronous data transmission. Further, many of these standard interfaces do not provide divided down gated clocks, which are useful in many applications across the interface.

In another approach, one of the components attaching to the interface is designed to optimize its function rather than to enhance its attachability to the interface. As a result, special external hardware is required to attach the optimized component to other components in the using system.

SUMMARY OF THE INVENTION

In accordance with the present invention, an interface is provided between a master unit on one side of the interface and a plurality of slave units on the other side. The master unit controls the slave units by initializing and programming them and by exchanging data with them. Including at least one data line, the present invention requires a minimum of five lines from the master unit to each slave unit. If just one data line is provided, the data exchange will be serial in nature. However, additional data lines can be employed to permit parallel data transfer. The interface includes a master clock line and a gate clock line the gated clock line having a frequency which is a submultiple of the master clock frequency. An important feature of this invention is that in one mode, the interface may be operated in a burst mode in which data is transferred at either the master clock frequency or at the frequency of the gated clock. In an alternate mode of operation within a window created by the gated clock, a selectable number of data bits may be transferred. This number of bits may be equal to the number of bit periods in the gated clock window or alternatively, may be as small as a single bit during the window.

The present invention is particularly adapted for interfacing a digital master unit to a plurality of analog slave units. As mentioned above, prior art asynchronous interfaces require considerable additional hardware to synchronize to many analog functions Additionally, it is desirable to obtain the clock signal for the analog units from the digital master unit, particularly where there are a number of analog slave units to be controlled. Further, an easily expandable and alterable interface providing for different functions, data rates and clocking for the different analog slave unit functions which are supported is desirable.

The invention provides for rapid initialization programming of the slave units and a fast "dump" time when operating in the burst mode.

DESCRIPTION OF THE PREFERRED EMBODIMENT

Figure 1:
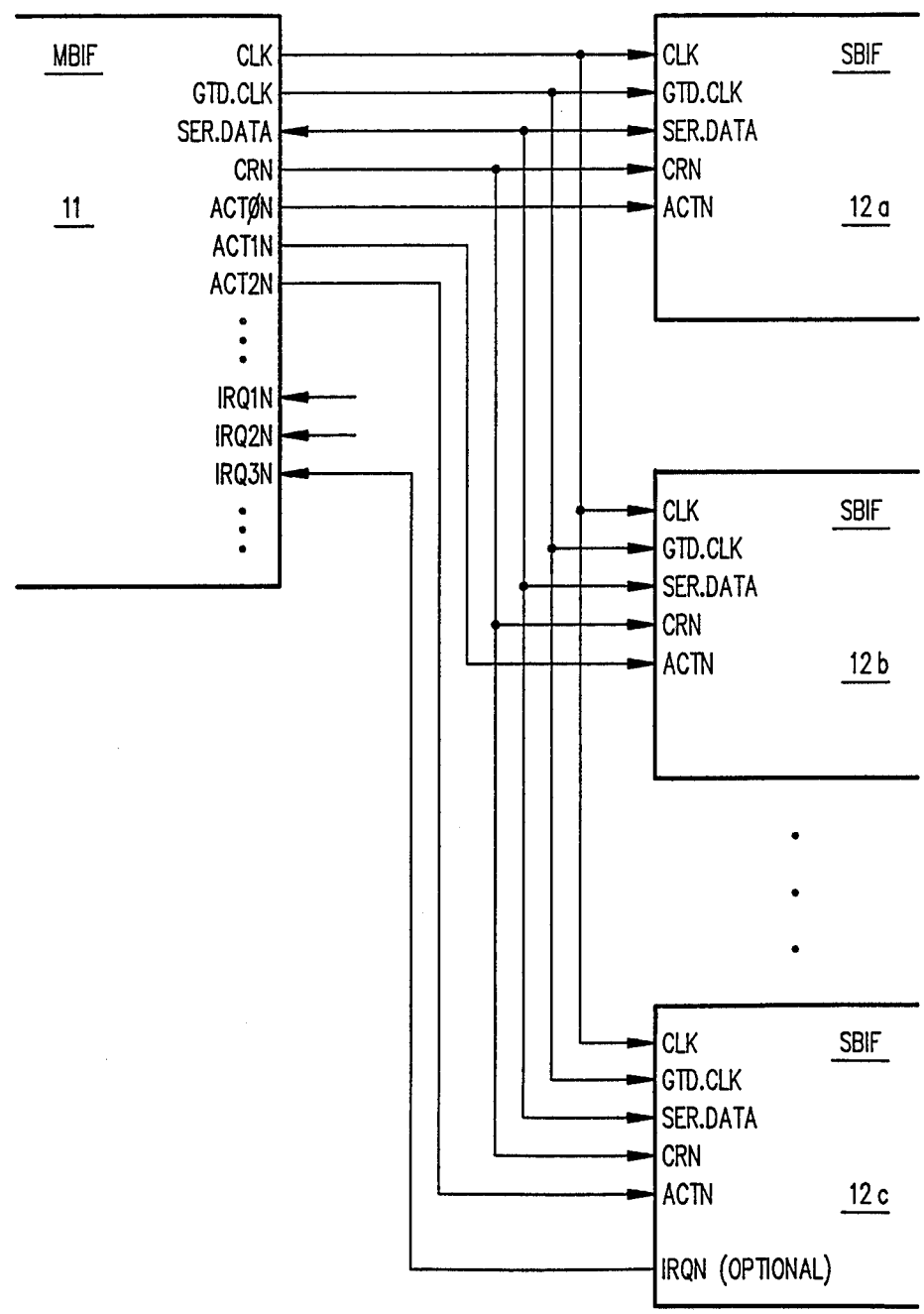
FIG. 1 illustrates the minimum number of lines in the interfaces of the present invention.

Referring to FIG. 1, a master bus interface function (MBIF) 11 is shown communicating with a plurality of slave bus interface functions (SBIF) 12a, 12b, 12c. There are a minimum of five lines from the MBIF to each SBIF and the names of these lines and their function or content from the SBIF point of view are as follows.

CLK—Input—Clock:

Clock is an active high input used to generate the timing signals on the bus interface and, in some cases, other internal logic.

GTD.CLK—Input—Gated Clock:

Gated Clock is an active high input used to generate the appropriate timing control internal to the slave unit. This may be eight times slower than CLK, for example, for an analog function.

SER.DATA—I/O—Serial Data:

Serial Data is an active high bidirectional signal used for serial data transfer.

CRN—Input—Command Register:

Command Register is an active low input used to indicate a write to the Command Register. When inactive, CRN indicates the next transfer will perform the command in the Command Register.

ACTN—Input—Active:

Active is an active low input used to enable the SBIF to start sending or receiving bits off the SER.DATA line. ACTN will be the length of one word transfer.

IRQN—Output—Interrupt Request:

Interrupt request is a synchronous active low output used to request service from the master (MBIF).

The Signal Name Definitions and functions from the MBIF point of view are as follows:

CLK—Output—Clock;

Clock is an active high output used to generate the timing signals on the bus interface.

GTD.CLK—Output—Gated Clock:

Gated Clock is an active high output generated from CLK used in the slave and in some cases used to provide a window in which transfers can take place. GTD.CLK may be assumed to always be 50% duty cycle. The analog function can generate phases off both edges.

SER.DATA—I/O—Serial Data:

Serial Data is an active high bidirectional signal used for serial data transfer.

CRN—Output—Command Register:

Command Register is an active low output used to indicate a write to the Command Register. When inactive, CRN indicates the next transfer will perform the command in the Command Register.

ACTN—Output—Active:

Active is an active low output used to enable the SBIF to start sending or receiving bits off the SER.-DATA line. ACTN will be the length of one word transfer.

IRQN—Input—Interrupt Request:

Interrupt request is a synchronous active low input used to recognize a request for service from the slave (SBIF).

Figure 2:
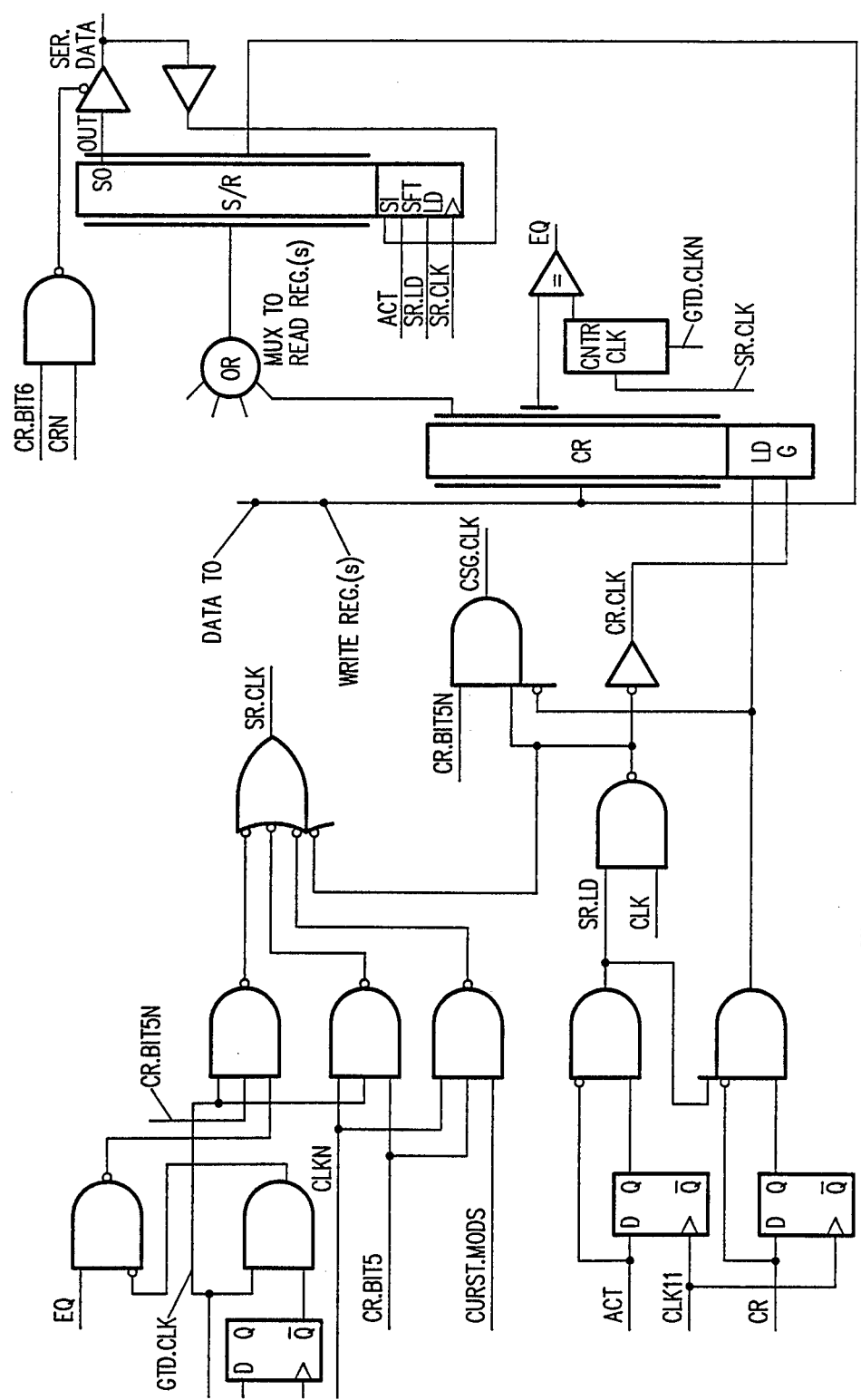
FIG. 2 illustrates one embodiment for implementing the logic in a slave unit attached to the interface of this invention.

CR—Register—As shown in FIG. 2, each SBIF includes a Command Register (CR):

The Command Register will hold the address of the register to be read or written or processed. It also holds a bit for direction control and other control information like selection of a bit transfer per GTD.CLK or a word transfer per GTD.CLK and reset. A write to CR cannot be programmed in CR. Typical commands to be implemented are:
1. a read from CR
2. a read or write to other registers
3. data integrity verification routines such as:
   a. register x write followed by register x read
   b. if register y is a read-only register, read register y multiple times before recording to the source that it was read.
4. data transfer routines such as:
   a. write a slave register, read status for acceptance of write
   b. read slave register, read status for acceptance of read
5. initialization routines:
   a. internal reset
   b. stream of register loads Once a CR is loaded, it can perform the same command again and again. For example, if a data transfer routine like a) described above were set up, this can all be done in one GTD.CLK time. On the next GTD.CLK, the CR need not be loaded. The master can send the next byte and read status on acceptance of that byte.

On initialization, when the state of CR is unknown, the MBIF will always assume worst case, which is CR is programmed for 1 bit transfer/GTD.CLK. MBIF will send the CR value, which initially will be an idle state; all zeroes. For the length of the transfer, ACTN & CRN will be active SER.DATA will be zero. When ACTN and CRN go inactive, CR will be loaded with all zeroes, which is an idle state. It will be seen in the logic that CR is only loaded when CRN and ACTN have gone inactive. In this manner, there is no need for a special bit or code in CR for reset, when it is guaranteed that the first write to CR will be successful.

Other bits may be employed in CR for selecting how many bits to transfer per GTD.CLK. In the logic of FIG. 2 the counter and comparator for generating EQ are shown. If in GTD.CLK mode, if EQ is inactive, SR.CLK will continue to be asserted when GTD.CLK is active, the counter will be incrementing, until EQ becomes active. EQ being active signals the end of bit transmission in the window of data transfer (it will disable SR.CLK's). EQ goes inactive when the counter is reset, which is when GRD.CLK is inactive. The cycle starts over when the next GTD.CLK comes. There is always at least one bit transferred in GRT.CLK mode.

Figure 3:
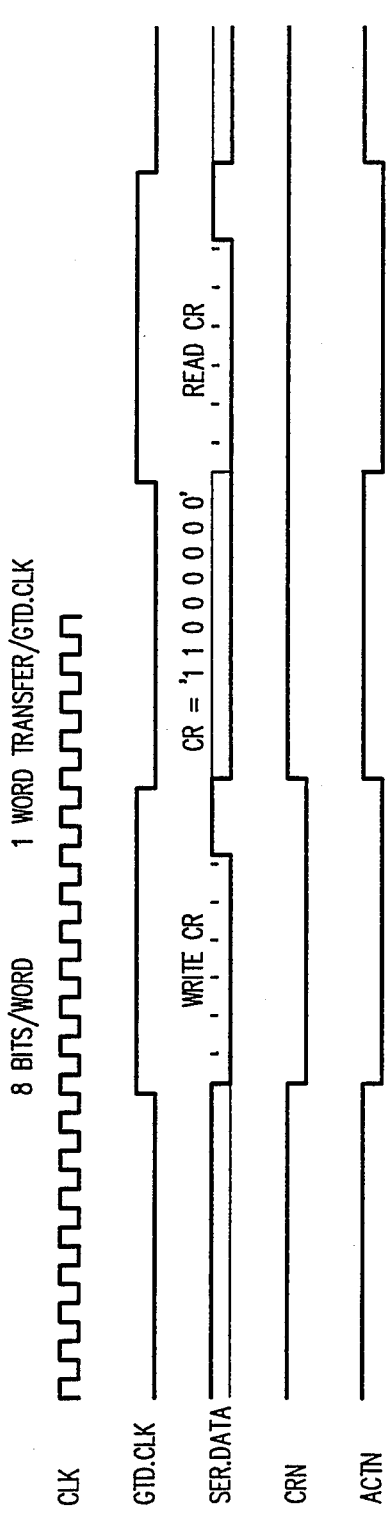
FIGS. 3 and 4 illustrated one embodiment for timing, using the logic of FIG. 2.

For the following functional description of FIGS. 1, 2, 3 and 4, CR-BIT6 is active if MSIB wants to read (direction control bit). CR-BIT5 is active if it is not 1 bit transfer/ GTD.CLK. All FIG. 3 and 4 timing assume CR is initialized. The first transfer in FIG. 3 is a write to CR with the value "11000000." The last significant bit is transferred first. CRN and ACTN go active when MFIF is ready to transfer and GTD.CLK is active. In FIG. 2, it will be seen that if CRN is active, SER.DATA line cannot be driven from any SBIF; it must be an input. ACT enables shifting of the shift register S/R. SR.LD is for sending data to MBIF and is inactive on this transfer.

SR.CLK has four sources. If CR.BIT5 is inactive (1 bit transfer/GTD.CLK), SR.CLK will go active ½ CLK time after GTD.CLK is active. The second source for SR.CLK is if CR.BIT5 is active and it's not Burst Mode; and the third source is if it is Burst Mode. The fourth source for SR.CLK is loading it with the next read transfer (SR.LD).

In the example transfer of FIG. 3, the second source is used. So eight SR.CLK's are issued, the CRN, ACTN and GTD.CLK go inactive. THe S/R is now filled with the CR value. CR.LD and CR.CLK go active, loading CR. On the next CLKN, CR.LD goes inactive, completing the write to CR by MBIF.

Figure 4:
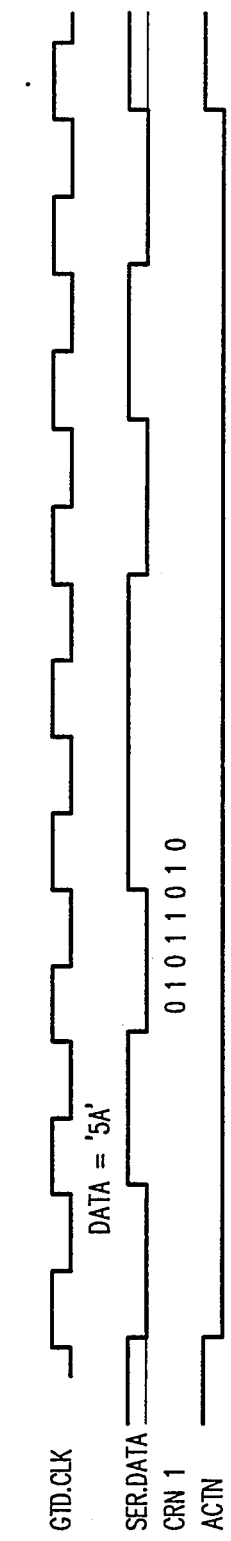

The transfer in FIG. 4 is a read of CR, with ACTN going active. The previous CR load asserted CR.BIT6 (read) and SR is already loaded with the CR value. Eight SR.CLK's shift the eight bits of data out and ACTN then goes inactive.

The features of the bus interface design with the preferred embodiment of the present invention include the following:
1. Synchronous interface that runs up to 12 MHz. Maximum effective data rate handled is 1 MHz, with current technology.
2. General purpose, but unique enough to satisfy the special needs of the Analog to Digital environment and to not be a current industry standard bus interface.
3. Serial design with expansion or upgrade to parallel.
4. From the SBIF point of view, there is a minimum I/O and digital logic to support the interface.
5. The only form of data integrity verification implemented is the ability for the master on the bus to read any register written to or to read a read-only register multiple times.
6. MBIF is always the master. This eliminates the need for a bus arbitration scheme. Only the MBIF initiates and controls all transfers. All SBIF's are slaves. SBIF's can post requests that are polled by the MBIF or use the optional interrupt signal for requesting servicing by the master.
7. The Serial Interface is preferred because of the minimum of I/O; it is a slow effective transfer rate required in most cases. The minimum I/O required on MBIF is CLK, GTD.CLK, SER.DATA, CRN, and ACTN. There is an optional IRQN.
8. Interrupts can be posted to the master (MBIF) through a status bit in a register or using an external pin IRQN.
9. GTD.CLK or CLK can be used to transfer bits. For data transfer to occur, ACTN must be active. The number of bits per word to be transferred is defined by the active time of ACTN.

The above illustrates the flexibility of the present invention in providing the capability of controlling the rate of data transmission by means of the gated clock without requiring an excessive amount of logic or other circuitry.

What is claimed is:
1. A bus interface system for communicating data bits and commands between a master unit and a plurality of slave units, comprising:

a separate clock line extending from said master unit to each of said slave units;

means for supplying a series of clock pulses to said clock lines;

a separate gated clock line extending from said master unit to each of said slave units;

a separate data line extending from said master unit to each of said slave units for transferring data between said master unit and the associated slave unit;

a command register in each of said slave units;

a separate command register line extending from said master unit to said command register in each of said slave units;

a separate active line extending from said master unit to each of said slave units, one of said active lines when active indicating to its associated slave unit that information is to be transferred between said associated slave unit and said master unit;

means for controlling said command register line extending to the one of said slave units whose active line is active to indicate to said slave unit whether the information to be transferred is data or is a command;

burst mode control means for transmitting a data bit to the active one of said slave units for each clock pulse on the associated clock line; and programmable gated clock control means for controlling the one of said gated clock lines extending to the one of said slave units whose active line is active to programmably control the number of clock pulses utilized to transfer a given bit.

2. An interface system in accordance with claim 1 in which said data exchange means operates in a burst mode at either the frequency of said clock signals on said clock line or at the frequency of said gated clock signals on said gated clock line.

3. An interface system in accordance with claim 1 including means for controlling the exchange of a variable amount of data on said data line during each cycle of said gated clock signal.

4. An interface system in accordance with claim 3 in which one bit of data is exchanged during each cycle of said gated clock signal.

5. An interface system in accordance with claim 3 in which a full word of data is exchanged during each cycle of said gated clock signal.

6. An interface system in accordance with claim 1 including an interrupt request line from at least one of said slave units to said master unit.

7. An interface system in accordance with claim 1 including a plurality of said data lines to permit parallel transmission of data between said master unit and at least one of said slave units

* * * * *